United States Patent
Chitrapu et al.

(10) Patent No.: US 7,532,723 B2
(45) Date of Patent: May 12, 2009

(54) TOKENS/KEYS FOR WIRELESS COMMUNICATIONS

(75) Inventors: Prabhakar R. Chitrapu, Blue Bell, PA (US); Alain Charles Louis Briancon, Poolesville, MD (US); Akinlolu Oloruntosi Kumoluyi, Plainfield, NJ (US); Alan Gerald Carlton, Mineola, NY (US); Kiran Kumar S. Vanganuru, Vienna, VA (US); Richard Dan Herschaft, Whitestone, NY (US); John Erich Hoffmann, Indialantic, FL (US); John Thommana, Austin, TX (US); Debashish Purkayastha, Pottstown, PA (US); Guodong Zhang, Farmingdale, NY (US); Robert Lind Olesen, Huntington, NY (US); Alexander Reznik, Titusville, NJ (US); TieJun Shan, Upper Salford, PA (US); Sung-Hyuk Shin, Northvale, NJ (US); Amit Singhal, King of Prussia, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/996,493

(22) Filed: Nov. 23, 2004

(65) Prior Publication Data

US 2005/0154925 A1     Jul. 14, 2005

Related U.S. Application Data

(60) Provisional application No. 60/545,678, filed on Feb. 18, 2004, provisional application No. 60/536,133, filed on Jan. 13, 2004, provisional application No. 60/524,959, filed on Nov. 24, 2003.

(51) Int. Cl.
*H04L 9/00* (2006.01)
*G06F 7/58* (2006.01)

(52) U.S. Cl. .............................................. 380/44; 726/9
(58) Field of Classification Search ................... 726/9; 380/44
See application file for complete search history.

(56) References Cited

U.S. PATENT DOCUMENTS

| 5,201,000 | A | 4/1993 | Matyas et al. |
| 5,274,666 | A | 12/1993 | Dowdell et al. |
| 5,568,483 | A | 10/1996 | Padovani et al. |

(Continued)

FOREIGN PATENT DOCUMENTS

CA      2454761      2/2003

(Continued)

OTHER PUBLICATIONS

Schneier, Bruce, "Applied Cryptography," 1996, pp. 420-426.*

(Continued)

*Primary Examiner*—Emmanuel L Moise
*Assistant Examiner*—Michael Pyzocha
(74) *Attorney, Agent, or Firm*—Volpe and Koenig, P.C.

(57) ABSTRACT

Tokens/keys are produced for wireless communications. These tokens/keys are used for watermarks, signature insertion, encryption and other uses. In one embodiment, contextual information is used to generate tokens/keys. The tokens/keys may be derived directly from the contextual information. The contextual information may be used in conjunction with other information to derive the tokens/keys. Tokens/keys may be exchanged between transmit/receive units. The exchange of these tokens/keys may be encrypted.

6 Claims, 5 Drawing Sheets

U.S. PATENT DOCUMENTS

| | | | |
|---|---|---|---|
| 5,602,916 A * | 2/1997 | Grube et al. | 380/270 |
| 5,778,304 A | 7/1998 | Grube et al. | |
| 5,808,296 A | 9/1998 | McMonagle et al. | |
| 5,872,519 A | 2/1999 | Issa et al. | |
| 5,953,424 A * | 9/1999 | Vogelesang et al. | 713/169 |
| 5,960,081 A | 9/1999 | Vynne et al. | |
| 5,966,441 A * | 10/1999 | Calamera | 713/167 |
| 6,018,374 A | 1/2000 | Wrobleski | |
| 6,035,398 A * | 3/2000 | Bjorn | 713/186 |
| 6,115,580 A | 9/2000 | Chuprun et al. | |
| 6,266,541 B1 | 7/2001 | Noda | |
| 6,307,936 B1 * | 10/2001 | Ober et al. | 380/30 |
| 6,343,213 B1 | 1/2002 | Steer et al. | |
| 6,353,778 B1 | 3/2002 | Brown | |
| 6,359,998 B1 | 3/2002 | Cooklev | |
| 6,393,254 B1 | 5/2002 | Pousada | |
| 6,492,897 B1 | 12/2002 | Mowery, Jr. | |
| 6,496,928 B1 | 12/2002 | Deo et al. | |
| 6,529,600 B1 | 3/2003 | Epstein et al. | |
| 6,559,883 B1 | 5/2003 | Fancher et al. | |
| 6,591,096 B2 | 7/2003 | Ezuriko | |
| 6,625,455 B1 | 9/2003 | Ariga | |
| 6,661,373 B1 | 12/2003 | Holliday | |
| 6,662,023 B1 | 12/2003 | Helle | |
| 6,687,375 B1 * | 2/2004 | Matyas et al. | 380/45 |
| 6,687,497 B1 | 2/2004 | Parvulescu et al. | |
| 6,728,323 B1 | 4/2004 | Chen et al. | |
| 6,738,572 B2 | 5/2004 | Hunter | |
| 6,771,946 B1 | 8/2004 | Oyaski | |
| 6,792,130 B1 | 9/2004 | Jones et al. | |
| 6,868,229 B2 | 3/2005 | Balogh | |
| 6,880,009 B2 | 4/2005 | Charas | |
| 6,915,002 B2 | 7/2005 | Gustafson | |
| 6,928,287 B2 | 8/2005 | Trott et al. | |
| 6,937,843 B2 | 8/2005 | Foschini et al. | |
| 6,983,376 B2 | 1/2006 | Maggenti | |
| 7,055,033 B2 | 5/2006 | Guthery | |
| 7,079,480 B2 | 7/2006 | Agee | |
| 7,171,020 B2 | 1/2007 | Rhoads et al. | |
| 7,203,527 B2 | 4/2007 | Czaja et al. | |
| 7,266,217 B2 | 9/2007 | Rhoads et al. | |
| 2001/0031631 A1 | 10/2001 | Pitts | |
| 2001/0037465 A1 | 11/2001 | Hart, III et al. | |
| 2002/0021721 A1 | 2/2002 | Jiang et al. | |
| 2002/0039896 A1 | 4/2002 | Brown | |
| 2002/0055361 A1 | 5/2002 | McDonnell et al. | |
| 2002/0058497 A1 | 5/2002 | Jeong | |
| 2002/0076084 A1 | 6/2002 | Tian et al. | |
| 2002/0107032 A1 | 8/2002 | Agness et al. | |
| 2002/0186845 A1 | 12/2002 | Dutta et al. | |
| 2003/0009683 A1 | 1/2003 | Schwenck et al. | |
| 2003/0030680 A1 | 2/2003 | Cofta et al. | |
| 2003/0040326 A1 | 2/2003 | Levy et al. | |
| 2003/0072450 A1 | 4/2003 | Maggenti | |
| 2003/0078076 A1 | 4/2003 | Kuwajima et al. | |
| 2003/0086371 A1 | 5/2003 | Walton et al. | |
| 2003/0122671 A1 | 7/2003 | Jespersen | |
| 2003/0123659 A1 | 7/2003 | Forstrom et al. | |
| 2003/0133573 A1 | 7/2003 | Himmel et al. | |
| 2003/0169342 A1 | 9/2003 | Steinberg et al. | |
| 2003/0174858 A1 | 9/2003 | Kim et al. | |
| 2003/0219231 A1 | 11/2003 | Vernon | |
| 2004/0001553 A1 | 1/2004 | Steentra et al. | |
| 2004/0029560 A1 | 2/2004 | Ariga | |
| 2004/0081131 A1 | 4/2004 | Walton et al. | |
| 2004/0100897 A1 | 5/2004 | Shattil | |
| 2004/0109566 A1 | 6/2004 | Yamamoto | |
| 2004/0110515 A1 | 6/2004 | Blumberg et al. | |
| 2004/0155969 A1 | 8/2004 | Hayashi | |
| 2004/0198306 A1 | 10/2004 | Singh et al. | |
| 2004/0204021 A1 | 10/2004 | Cocita | |
| 2004/0252837 A1 | 12/2004 | Harvey et al. | |
| 2004/0264699 A1 | 12/2004 | Meandzija et al. | |
| 2004/0264701 A1 | 12/2004 | Lee et al. | |
| 2005/0007456 A1 | 1/2005 | Lee et al. | |
| 2005/0008324 A1 | 1/2005 | Balogh | |
| 2005/0039020 A1 | 2/2005 | Levy | |
| 2005/0043548 A1 | 2/2005 | Cates | |
| 2005/0064865 A1 | 3/2005 | Goldberg | |
| 2005/0180315 A1 | 8/2005 | Chitrapu et al. | |
| 2005/0220322 A1 | 10/2005 | Olesen et al. | |
| 2006/0156009 A1 | 7/2006 | Shin et al. | |
| 2006/0200673 A1 | 9/2006 | Zhang et al. | |
| 2007/0071241 A1 | 3/2007 | Caprella et al. | |
| 2007/0121939 A1 | 5/2007 | Olesen et al. | |

FOREIGN PATENT DOCUMENTS

| | | |
|---|---|---|
| EP | 0 505 266 | 3/1992 |
| EP | 0 505 266 A1 | 3/1992 |
| EP | 0 830 046 | 3/1998 |
| EP | 0 830 046 A2 | 3/1998 |
| EP | 1 130 500 | 9/2001 |
| EP | 1 130 500 A2 | 9/2001 |
| EP | 1 139 684 | 10/2001 |
| EP | 1 139 684 A1 | 10/2001 |
| EP | 1 172 270 | 1/2002 |
| EP | 1 172 270 A1 | 1/2002 |
| EP | 1 182 901 | 2/2002 |
| EP | 1 182 901 A2 | 2/2002 |
| EP | 1 379 098 | 1/2004 |
| EP | 1 379 098 A1 | 1/2004 |
| EP | 1 381 234 | 1/2004 |
| EP | 1 381 234 A1 | 1/2004 |
| EP | 1 185 923 | 3/2004 |
| EP | 1 185 923 B1 | 3/2004 |
| EP | 1 445 93 | 8/2004 |
| EP | 1 445 923 | 8/2004 |
| EP | 1 445 923 A1 | 8/2004 |
| EP | 1 499 148 | 1/2005 |
| EP | 1 499 148 A2 | 1/2005 |
| GB | 211612 | 2/1927 |
| GB | 2 329 794 | 3/1999 |
| GB | 2 329 794 A | 3/1999 |
| GB | 2 343 339 | 5/2000 |
| GB | 2 343 339 A | 5/2000 |
| GB | 2 348 573 | 10/2000 |
| GB | 2 348 573 A | 10/2000 |
| GB | 2 367 720 | 4/2002 |
| GB | 2 367 720 A | 4/2002 |
| GB | 2 374 986 | 10/2002 |
| GB | 2 374 986 A | 10/2002 |
| GB | 2 393 075 | 3/2004 |
| GB | 2 393 075 A | 3/2004 |
| JP | 2000013497 | 1/2000 |
| JP | 2000013497 A | 1/2000 |
| JP | 2000032557 | 1/2000 |
| JP | 2000032557 A | 1/2000 |
| JP | 2000152217 | 5/2000 |
| JP | 2000152217 A | 5/2000 |
| JP | 2000165952 | 6/2000 |
| JP | 2000165952 A | 6/2000 |
| JP | 2000332890 | 11/2000 |
| JP | 2000332890 A | 11/2000 |
| JP | 2001313006 | 11/2001 |
| JP | 2001313006 A | 11/2001 |
| JP | 2002044736 | 2/2002 |
| JP | 2002044736 A | 2/2002 |
| JP | 2002125267 | 4/2002 |
| JP | 2002125267 A | 4/2002 |
| JP | 2002159059 | 5/2002 |
| JP | 2002159059 A | 5/2002 |
| JP | 2003058173 | 2/2003 |
| JP | 2003070058 | 3/2003 |

| | | | |
|---|---|---|---|
| JP | 2003070058 A | 3/2003 | |
| JP | 2003143649 | 5/2003 | |
| JP | 2003143649 A | 5/2003 | |
| JP | 2003219466 | 7/2003 | |
| JP | 2003219466 A | 7/2003 | |
| JP | 2004056769 | 2/2004 | |
| JP | 2004056769 A | 2/2004 | |
| JP | 2004088273 | 3/2004 | |
| JP | 2004088273 A | 3/2004 | |
| JP | 2004153324 | 5/2004 | |
| JP | 2004153324 A | 5/2004 | |
| JP | 2004242096 | 8/2004 | |
| JP | 2004242096 A | 8/2004 | |
| JP | 2004260631 | 9/2004 | |
| JP | 2004260631 A | 9/2004 | |
| JP | 2004260796 | 9/2004 | |
| JP | 2004260796 A | 9/2004 | |
| JP | 2005033799 | 2/2005 | |
| TW | 529281 | 4/2003 | |
| TW | 563305 | 11/2003 | |
| WO | 98/34412 | 8/1998 | |
| WO | 98/34412 A2 | 8/1998 | |
| WO | 99/59335 | 11/1999 | |
| WO | 00/60556 | 10/2000 | |
| WO | 00/60556 A1 | 10/2000 | |
| WO | 02/103968 | 12/2002 | |
| WO | 02/103968 A1 | 12/2002 | |
| WO | 03/028342 | 4/2003 | |
| WO | 03/028342 A2 | 4/2003 | |
| WO | 03/040898 | 5/2003 | |
| WO | 03/040898 A1 | 5/2003 | |
| WO | 03/047207 | 6/2003 | |
| WO | 03/047207 A1 | 6/2003 | |
| WO | 2004/089021 | 10/2004 | |
| WO | 2004/089021 A3 | 10/2004 | |
| WO | 2004/102313 | 11/2004 | |
| WO | 2004/102313 A2 | 11/2004 | |

OTHER PUBLICATIONS

Sanzgiri et al., "A Secure Routing Protocol for Ad Hoc Networks", Proceedings of the 10th IEEE International Conference on Network Protocols (ICNP '02), IEEE, 2002, pp. 1-10.

Arslanagic, "Personal Firewall in Mobile Phone", Masters Thesis in Information and Communication Technology, Agder University College Faculty of Engineering and Science, Grimstad, Norway, May 2004.

Mobasseri, "Exploring CDMA for Watermarking of Digital Video", Security and Watermarking of Multimedia Contents, Electronic Imaging'99, San Jose, Jan. 23-29, 1999.

Sanzgiri et al., "A Secure Routing Protocol for Ad Hoc Networks", Proceedings of the 10th IEEE International Conference on Network Protocols (ICNP '02), IEEE, 2002, pp. 1-10.

Arslanagic, "Personal Firewall in Mobile Phone", Masters Thesis in Information and Communication Technology, Agder University College Faculty of Engineering and Science, Grimstad, Norway, May 2004.

Menezes et al., *Handbook of Applied Cryptography*, 1997, p. 172.

Schneier, *Applied Cryptography Second Edition*, 1996, pp. 180 and 426-428.

Alattar, "*Smart Images*' Using *Digimarc's* Watermarking Technology," IS&T/SPIE's 12th International Symposium on Electronic Imaging, San Jose, CA, vol. 3971, No. 25, (Jan. 25, 2000).

Arslanagic, "Personal Firewall in Mobile Phone", Masters Thesis in Information and Communication Technology, Agder University College Faculty of Engineering and Science, Grimstad, Norway (May 2004).

Costa, M.H., "Writing on Dirty Paper," IEEE Transactions on Information Theory, vol. IT-29 No. 3, pp. 439-441, (1983).

Cox et al., "Watermarking as Communications with Side Information," Proceedings of the IEEE, pp. 1127-1141, (1999).

Menezes, Alfred J. et al. "Handbook of Applied Cryptography", p. 172, (1997).

Podilchuk et al., "Digital Watermarking: Algorithms and Applications," IEEE Signal Processing Magazine, (Jul. 2001).

Sanzgiri et al., "A Secure Routing Protocol for Ad Hoc Networks," Proceedings of the 10th IEEE International Conference on Network Protocols (ICNP '02), IEEE, pp. 1-10, (2002).

Schneier, Bruce "Applied Cryptography" Second Edition, pp. 180 and 426-480, (1996).

Song et al., "Meta-fragile Watermarking for Wireless Networks," International Conference on Communications, Circuits and Systems and West Sino Expositions, IEEE 2002, vol. 1, pp. 490-491, (Jun. 29, 2002).

Third Generation Partnership Project, "Technical Specification Group Radio Access Network; Multiplexing and channel coding (FDD) (Release 5)," 3GPP TS 25.212 V5.6.0 (Sep. 2003).

Third Generation Partnership Project, "Technical Specification Group Radio Access Network; Multiplexing and channel coding (FDD) (Release 6)," 3GPP TS 25.212 V6.2.0 (Jun. 2004).

Third Generation Partnership Project 2, "Physical Layer Standard for cdma2000 Spread Spectrum Systems (Release C)," 3GPP2 C.S0002-C Version 1.0 (May 2002).

Alattar, "*Smart Images*' Using *Digimarc's* Watermarking Technology,"IS&T/SPIE's 12th International Symposium on Electronic Imaging, San Jose, CA, vol. 3971, No. 25, (Jan. 25, 2000).

Arslanagic, "Personal Firewall in Mobile Phone", Masters Thesis in Information and Communication Technology, Agder University College Faculty of Engineering and Science, Grimstad, Norway (May 2004).

Costa, M.H., "Writing on Dirty Paper," IEEE Transactions on Information Theory, vol. IT-29 No. 3, pp. 439-441, (1983).

Cox et al., "Watermarking as Communications with Side Information," Proceedings of the IEEE, pp. 1127-1141, (1999).

Menezes, Alfred J. et al. "Handbook of Applied Cryptography", p. 172, (1997).

Mobasseri, "Exploring CDMA for Watermarking of Digital Video", Security and Watermarking of Multimedia Contents, Electronic Imaging'99, San Jose, (Jan.23-29, 1999).

Podilchuk et al., "Digital Watermarking: Algorithms and Applications," IEEE Signal Processing Magazine, (Jul. 2001).

Sanzgiri et al., "A Secure Routing Protocol for Ad Hoc Networks," Proceedings of the 10th IEEE International Conference on Network Protocols (ICNP '02), IEEE, pp. 1-10, (2002).

Schneier, Bruce "Applied Cryptography" Second Edition, pp. 180 and 426-480, (1996).

Song et al., "Meta-fragile Watermarking for Wireless Networks," International Conference on Communications, Circuits and Systems and West Sino Expositions, IEEE 2002, vol. 1, pp. 490-491, (Jun. 29, 2002).

Third Generation Partnership Project, "Technical Specification Group Radio Access Network; Multiplexing and channel coding (FDD) (Release 5)," 3GPP TS 25.212 V5.6.0 (Sep. 2003).

Third Generation Partnership Project, "Technical Specification Group Radio Access Network; Multiplexing and channel coding (FDD) (Release 6)" 3GPP TS 25.212 V6.2.0 (Jun. 2004).

Third Generation Partnership Project 2, "Physical Layer Standard for cdma2000 Spread Spectrum Systems (Release C)," 3GPP2 C.S0002-C Version 1.0 (May 2002).

\* cited by examiner

WATERMARKING

SECURITY NETWORK 92

TOKENS/KEYS FOR WIRELESS COMMUNICATIONS

CROSS REFERENCE TO RELATED APPLICATION(S)

This application claims the benefit of U.S. Provisional application No. 60/524,959, filed on Nov. 24, 2003, U.S. Provisional application No. 60/545,678, filed Feb. 18, 2004 and U.S. Provisional application No. 60/536,133, filed Jan. 13, 2004, which are incorporated by reference as if fully set forth.

FIELD OF INVENTION

The present invention relates generally to wireless communications. More specifically, the present invention is directed to using tokens/keys for such communications.

BACKGROUND

Wireless systems are susceptible in many respects. These susceptibilities are increasing as new wireless technologies are growing in prevalence. Ad-hoc networks, where individual users communicate with each other directly without using intermediary network nodes, creates new susceptibilities to the users and networks. These susceptibilities can be categorized as "trust", "rights", "identity", "privacy" and "security" related issues.

"Trust" refers to the assurance that information communicated in these systems can be shared. To illustrate, a wireless user may want to know that a communication was sent to it from a trusted source and using trusted communication nodes. The user in an ad-hoc network may have no knowledge that the communication was transferred over a hacker's wireless device with packet sniffing software. Additionally, with the use of tunneling, intermediate nodes transferring the communication may be transparent to the wireless user.

"Rights" ("rights management") refers to the control of data. To illustrate, one wireless user may have limited rights in a wireless system. However, if that user colludes (knowingly or unknowingly) with a second node having superior rights, that user may gain rights above those that the user is allowed.

"Identity" refers to the control linked to the identity of the wireless user. To illustrate, a rogue wireless device may attempt to access a wireless network by pretending to be an authorized user of the network, by using that authorized user's identity. "Privacy" refers to maintaining privacy of the individual, data and context. A wireless user may not want others to know, which web sites he/she visits and, in particular, information sent to these sites, such as financial, medical, etc. "Security" refers to the security of the data and context, such as preventing an unauthorized individual access to a wireless user's information.

To reduce the susceptibility of wireless networks, techniques such as wired equivalent privacy (WEP), Wi-Fi Protected Access (WPA), Extensible authentication Protocol (EAP) and GSM based encryption are used. Although these techniques provide some protection, they are still susceptible to the trusts, rights, identity, privacy and security issued. To illustrate, although a particular wireless communication node may have the correct WEP keys to communicate with a wireless user, that user may not know whether he/she can "trust" that node.

Additionally, authentication of the user using these keys typically occurs at higher layers of the communication stack. Accordingly, even when these controls are in place, a rogue wireless user or hacker may have some (although limited) access to the communication stack. This access creates vulnerabilities, such as to denial of service attacks, among others.

Watermarks/signatures are techniques for adding metadata or unique information to media for signaling and/or security purposes. To reduce these susceptibilities to wireless communications, it is desirable to produce different tokens/keys for use in watermarks, signatures and encryption.

SUMMARY

Tokens/keys are produced for wireless communications. These tokens/keys are used for watermarks, signatures, encryption and other uses. In one embodiment, transmit receive unit (TRU) specific information is used to generate tokens/keys. The tokens/keys may be derived directly from the TRU specific information. The TRU specific information may be used in conjunction with other information to derive the tokens/keys. Tokens/keys may be exchanged between TRUs. The exchange of these tokens/keys may be encrypted.

DETAILED DESCRIPTION OF THE PREFERRED EMBODIMENTS

Hereafter, a wireless transmit/receive unit (WTRU) includes but is not limited to a user equipment, mobile station, fixed or mobile subscriber unit, pager, station (STA) or any other type of device capable of operating in a wireless environment. When referred to hereafter, a base station includes but is not limited to a Node-B, site controller, access point or any other type of interfacing device in a wireless environment. When referred to hereafter a transmit/receive unit (TRU) includes a WTRU, base station or a wired communication device.

Figure 1:
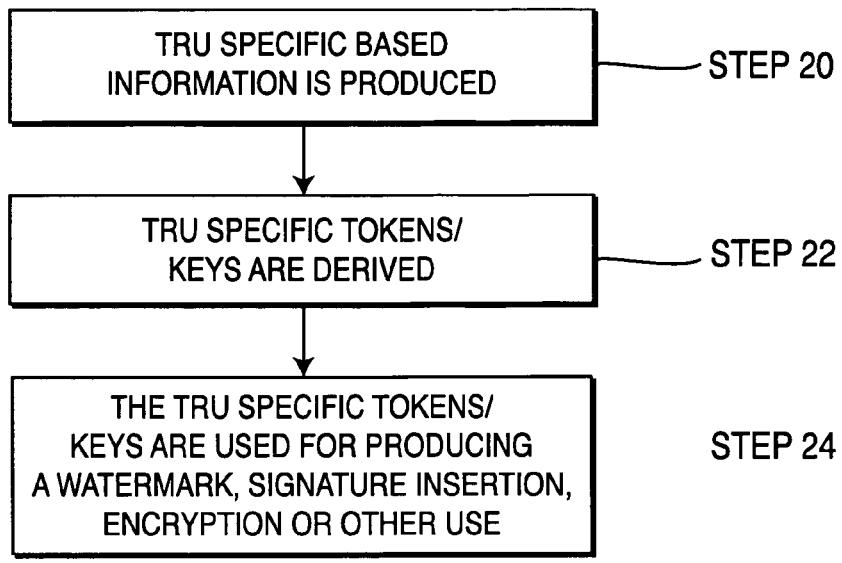
FIG. 1 is a simplified flow diagram of TRU specific tokens/keys generation.

FIG. 1 is a simplified flow chart for TRU specific based token/key generation. Initially, TRU specific based information is produced, step 20. TRU specific information is information that is specific to the TRU, such as physical layer information, capabilities, contextual information, equipment/performance information, TRU identity information, etc. Using the TRU specific based information, TRU specific based tokens/keys are derived, step 22. The TRU specific information may be combined with other information (including other TRU specific information and non-TRU specific information, such as public/private keys, time of day, location, etc.) to produce the tokens.

In an embodiment, the TRU specific information alone or combined with other information is converted into an N-bit vector. The number, N, of bits in the vector is preferably based on the specific application for the tokens/keys. Different techniques can be used to produce the vector. The information may be directly transformed into the token or any of various coding techniques may be used to convert the information into tokens/keys. These resulting tokens/keys are used for producing a watermark, signature insertion, encryption or other use, step 24.

Specific embodiments for producing a vector include hashing/compression. If a token/key of a fixed length is desired, the information to be used to produce a token is converted into a digital format, such as bits, if not already in that format. Some information may need to be converted into digital information, such as analog values (e.g. values for hardware non-linearities). A hashing algorithm receives the bits and converts the bits into a fixed length vector, such as of length N. Additionally, other compression techniques may be used. In one embodiment, after all the token/key derivation information is converted into digital form, the information is concatenated and run through a rate matching device so that a desired length or range of lengths is achieved.

Certain token/key generation information may need to have its format converted prior to the generation of the key/token. To illustrate, graphics or hypertext may need to be converted using a format conversion. For hypertext, it may be converted into ASC or for graphics, the values of a compressed file, such as GIF, JPEG, TIF, may be used or a check value, such as a circular redundancy code may be derived from the specific graphic data.

One type of TRU specific information is information relating to the user of the TRU. A user may input a codeword, password or personal identification number (PIN) as the TRU specific information. Alternately, the token itself later to be combined with other tokens is chosen by the user. Social information with respect to a social group network that the user belongs may be used as the TRU specific information. This information includes the user's likes and dislikes as well as information regarding the social network. This information may be input by the user or stored within the TRU or network. A biometric reading of the individual can be used as TRU specific information. Context surrounding and of the user may be captured, such as the mood of the user, road the user travels, rules, modes of user controlled TRU operation, Internet preferences, web favorites and cookies. An object external to the TRU device may be used to produce the TRU specific information. These devices include radio frequency (RF) tags, credit/debit/smart card, universal serial bus (USB) device or other external device. The use of user specific tokens makes it easier to determine out of character behavior.

Another type of TRU specific information is information relating to hardware/software information associated with the TRU. The hardware/software information includes hardware component identities, software identities, non-linear signatures of hardware components, information associated with a SIM/USIM card (such as information stored on a SIM/USIM) and information from a security chip. It may also include software operating system, software version numbers, remaining free memory (RAM and ROM), chip manufacturer identities, and chip integrator identities. This information also includes radio frequency (radio frequency channel number and band), automatic gain control (AGC), automatic frequency control (AFC), analog to digital converter, digital to analog converter and demodulator related information. The information derived from these parameters may be raw values, mean values, standard deviation values, variances, minimum values, peak values and peak to average values. Other hardware/software information pertains to algorithms of the TRU and internal state machine information. Power supply information may be used to generate tokens, such as the current flowing through the power supply or changes in that current as well as measuring the current over time or as a time function. Remaining battery power, absolute or as a percentage, may also be used to generate tokens.

The hardware/software information may include information of compound devices, such as combined wired and wireless devices. Information regarding which devices are connected, hardware/software of these devices, communication protocol between devices may be used for key generation. Additionally, information regarding virtual TRUs, such as a combination of TRUs and/or devices, may be used for token/key generation information.

Another type of TRU specific information is information relating to time. This time information includes the local generated time in the TRU, NIS derived time, network derived time, external time reference (such as from a Satellite), day/night information, morning/afternoon/evening/night information, current time zone, and an atomic clock embedded in the TRU. The time information may be relative, such as times of high network usage or high/low times of interference. Date information includes month, day, year, days into year, days left in the year, leap year or not, day of week, weekday or weekend or holiday.

Another type of TRU specific tokens/keys are measurements taken by the TRU. These techniques include multipath analysis, antenna related information, TRU transmit power level, received power level (such as for a beacon or broadcast channel), pathloss, non-linearities of transmitted/received signals (such as a non-linearity index of received signals), other non-linearities (such as spill over energy), out-of-band leakage signal characteristics, passband distortion characteristics, temperature (external or TRU) and change in absorption signature. To measure some of these values, another TRU may send a reference signal (beacon, pilot, broadcast channel, preamble or midamble), for these measurements to be taken. The reference signal may be a signal already existing in the wireless systems (such as a beacon, pilot or broadcast channel) or it may be transmitted specifically for these measurements (such as a specialized preamble). Measurement related information for use in generating tokens/keys includes an indicator of when block errors/bit errors occur.

Information relating to multipath can be used for token/key generation. The multipath information can include multipath locations, distance between these multipath locations, the number of paths and phase/amplitude of paths. Another related token/key is the rate of change of the multipath information. A dramatic change in any of those parameters indicates a potential problem, such as spoofing. Other multipath information is signal to interference/noise ratio (SINR) measurements, such as total and per path, SINR based on total energy, SINR for data channels, SINR for pilot channels, whether a line-of-sight multipath component is or is not present in the multipath profile, root mean squared (RMS) multipath spread, multipath clumps (length, energy, etc.), distance between multipath clumps, distance between first and last multipath component and length of channel response. A change in multipath criteria is a possible indication of an intruder. Sudden changes in multipath and/or interference may indicate that an intruder is present and added security is required.

Information relating to antennas includes antenna patterns (beams), antenna weights, delays between antenna elements, antenna spacing, antenna hardware information, antenna state (directional or omni), antenna configuration, antenna switching rate, antenna steering consistency, antenna cross correlation and characteristics of the spatial distribution. Other antenna related information includes angle of arrival or received signals, similarity/differences between signatures observed on a plurality of antennas (either an existing signature/preamble or special signature for token/key generation) and a rate of change of any of these parameters.

Location information includes GPS coordinates, distance from another TRU, time difference of arrival and time of arrival information, distance from networks, distance between networks, longitude/latitude, elevation, logical position with respect to connectivity, RSSI derived location measurements, angle of arrival, time of arrival, time distance of arrival and sensor based location measurements. Correlation of measured location (by the network or other non-TRU device) and that reported by a TRU can also be an authentication indication. Akin to location information is velocity based information, such as source/destination, bearing, relative velocity (including Doppler mean and multipath/symbol spread) and movement vector. The velocity can be that of the TRU itself, relative velocity between two or more TRUs or the velocity of another TRU or object. The location information may also be the area where the TRU is located, such as on/off a campus, urban/suburban environment, city/town, state/province and postal address. The location/velocity information may be provided by the TRU or a device connected to or communicating with the TRU.

Another technique to represent the physical environment of the TRU is to use a model. A model is selected based on various physical environment information and, possibly, other information. Observations are used to determine the parameters of the model. Using the model, a token/key is derived. Additionally, other physical environment information is the presence of other TRUs or devices in the TRU's vicinity as well as other TRUs/devices that are aware of that TRU. Other physical environmental information may be additional services in the same overlapping coverage area such as for a multimode TRU device.

Additionally, the TRU specific information may include information useful for transmission to another TRU, such as control, signal and other information. This information includes metadata from higher layer stacks, protocol parameters, transmit power control information, transport format combination indicator (TFCI), parameters for streaming video, resource allocation information, routing information, accident data and other signal control information.

In one aspect of control, one token/key may control the production of further tokens/keys. One token/key may even be a function of another token/key. A token/key may identify that a switch to a new token/key or a token/key of higher/lower security should be used. The control token/key may be used to indicate how further tokens/keys are produced, such as an indication of a hierarchy of group token/key sets, the union or intersection of such sets as well as the relationship and structure of the sets.

The tokens/keys may be used to distinguish a group of TRUs or users from others. The group may be a group that the user belongs in or a group based on wireless network properties or preferences, such as a group of TRUs with similar hardware, wireless characteristics, or location/direction/elevation. Such tokens/keys are derived from this group information.

To accelerate authorization of an entire group of TRUs, one TRU may act as a gateway. That TRU effectively authenticates the entire group, instead of each TRU individually authenticating itself.

The use of TRU specific tokens/keys is desirable. Since the tokens/keys are derived from information associated with a particular TRU, the token/key value itself can be used as added security measure. To illustrate, a token/key derived using a hardware number can be verified by a network or TRU to determine whether the hardware number is consistent with a specific TRU. Also to illustrate, a token/key derived using location information can be reviewed over time to verify that the user has not moved, such as one kilometer in a hundred milliseconds, indicating that someone is spoofing that user. The use of such tokens/keys also allows seamless transfer of location, control signaling, context awareness and routing information. The use of such tokens/keys allows for improved intrusion and unusual behavior detection as well as increased security.

Preferably, multiple sources of token/key generation information are combined to form the tokens/keys, although for minimal security no tokens/keys or a single source for tokens/keys may be used. Techniques for combining the information to form keys are compounding, data fusion, hashing, filtering, post processing, isomorphic and polymorphic combining and model parameter estimation. Based on the combining technique, rate matching may be necessary to reach a desired token/key length or length range.

To derive the criteria for combining tokens/keys, different techniques may be used. One technique is a fixed technique, where certain combinations or sets of combinations are determined for a given security level. Another technique is algorithm based techniques. In these techniques, a predetermined or a set of predetermined algorithms are used to derive tokens/keys. Another technique is rule based criteria. In rule based criteria, a set of rules are used to establish the information combinations used to derive the tokens/keys. Another technique is an inter-TRU signaling selection of token/key criteria. Using inter-TRU signaling, two or multiple TRUs agree upon combining criteria. The inter-TRU signaling is desirable as it allows for a TRU to obtain information that it desires for verification/authentication purposes. To illustrate, a first TRU may wish to verify that a second TRU has a specific hardware number to verify its authenticity. The first TRU may request that the second TRU generate a token including a serial number of that hardware component.

For enhanced security, it is desirable to combine information across abstraction layers. To illustrate, a token/key may be derived from information regarding software, hardware and physical layer measurement. Such a token would be difficult to spoof and can be partially verified in the network or by another TRU. To illustrate, the token of a spoofing TRU may replicate the correct hardware number of an authorized user. However, the spoofing TRU may not be able to replicate a software version number of the authorized user. Also to enhance security, information from a secure portion of the TRU and an insecure portion may be used to produce a token or key. Additionally, tokens/keys generated from an external device, such as from an unbiased third party, can be used to generate a portion of the token/key. Such information would be difficult for an unauthorized individual to create.

In conjunction with any of these techniques, triggers may be used. The triggers indicate when combining information to form tokens/keys is required and when changing the combining criteria may be used. To illustrate, when a TRU is in an area of higher traffic, additional security may be required making a change in combining criteria desirable.

It is desirable to change tokens/keys and watermarks/signatures over time to make detection and decoding of associated information more difficult. However, there is a trade-off between the rate of change of tokens/keys and watermarks/signatures and system overhead. Changing these values needs to be communicated to the appropriate TRUs. One manner to mitigate the required overhead is to change portions of the information used to derive a token (sub-token) at different rates. To illustrate, a mobile user may update a multipath aspect of the token/key frequently and a hardware serial number may never or seldom be updated.

The length of the token/key used to encrypt data depends on the desired security/complexity trade-off. For the highest amount of security, a key of the same length of the data is desired. To achieve this, a form of rate matching may be required. One drawback with this technique is that a considerable amount of token/key information exchange typically occurs to achieve tokens/keys of such length. Shorter tokens/keys can be used with lesser security provided.

The use of tokens/keys and watermarks/signatures on multiple abstraction layers has advantages in addition to reduced visibility. The quick detection of incorrect tokens/keys and watermarks/signatures (especially at lower abstraction layers) may reduce unnecessary processing and improve security. To illustrate, the detection of an incorrect token/key in the physical layer can prevent that data from being sent to higher abstract layers. As a result, a denial of service attack can be stopped at the physical layer and not at a higher level where it may already have been a successful attack. Such detection can lead to effectively turning off channels from unauthorized users preventing them any access to the wireless network. Additionally, if blocked at the physical layer, baseband processing can be turned-off, extending battery life or releasing those resources for other purposes.

As another illustration, the packet headers may be checked for certain token/key information. If that information is not present, that packet is discarded. As a result, when an undesired message is detected, essentially all the higher layers can be blocked from processing the message and thus wasting bandwidth and processing power. As a result, messages can be blocked at a variety of the abstraction layers.

Figure 2:
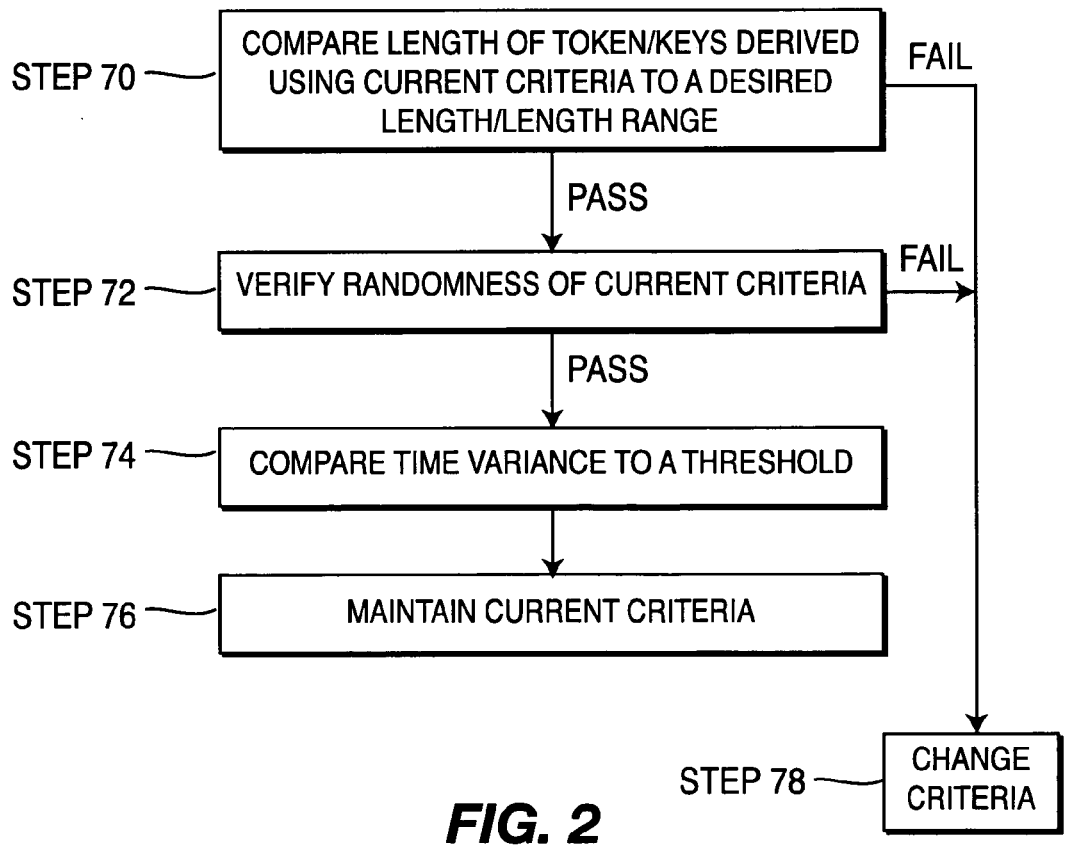
FIG. 2 is a simplified flow chart for changing token/key generation criteria.

An embodiment for determining when a change in tokens/keys is desirable uses three primary criteria, key space, randomness and time variance. The criteria for use in determining whether a token/key generation criteria is required may also be used to verify that an initial token/key generation technique is appropriate. As illustrated in FIG. 2, the length of tokens/keys derived using the current criteria is compared to a desired length/length range of such keys, step 70. If the current length does not meet the acceptable token/key length value/range, a change in token/key generation criteria is made, step 78. The randomness of the tokens/keys produced using the current criteria is checked to see that tokens/keys produced using the current criteria have sufficient randomness, step 72. Techniques for measuring the randomness include entropy estimation, level zip (LZ), wheeler estimation, mark-up chain with a number of sates, Huffman/block Huffman coding, histogram based techniques, Hamming distance and moment estimation. If it does not have sufficient randomness, a new criteria is used, step 78.

The time variance of the tokens is checked to determine whether a variability threshold is achieved, step 74. If the current criteria passes all three tests, the current criteria is kept, step 76. If it fails one of the tests, the criteria is changed, step 78. To illustrate, a TRU may change from a moving state, such as riding in a train, to a stationary state, such as in an Internet cafe. When riding the train, tokens/keys derived using Doppler shift, GPS coordinates and hardware information may produce tokens/keys with sufficient randomness. However, when in an Internet Cafe, this information may change very little, resulting in similar or identical tokens/keys. Accordingly, changing the criteria to add power supply current and/or the time stamp of a block error may be desirable to achieve the time variance.

Other reasons for changing token/key generation criteria may also occur. As the level of desired security changes, the token/key generation criteria may change. To illustrate, as security increases, token/key generation information may be compounded from more sources and more abstraction layers. The token/key generation criteria may also be changed due to adaptation and/or compounding purposes.

Additionally, a token/key may be derived for a group of TRUs. This token may be combined with individual TRU tokens or the group may have collective tokens. As the membership and other properties of the group changes, the group token/key is changed to maintain security for the new group.

Figure 3:
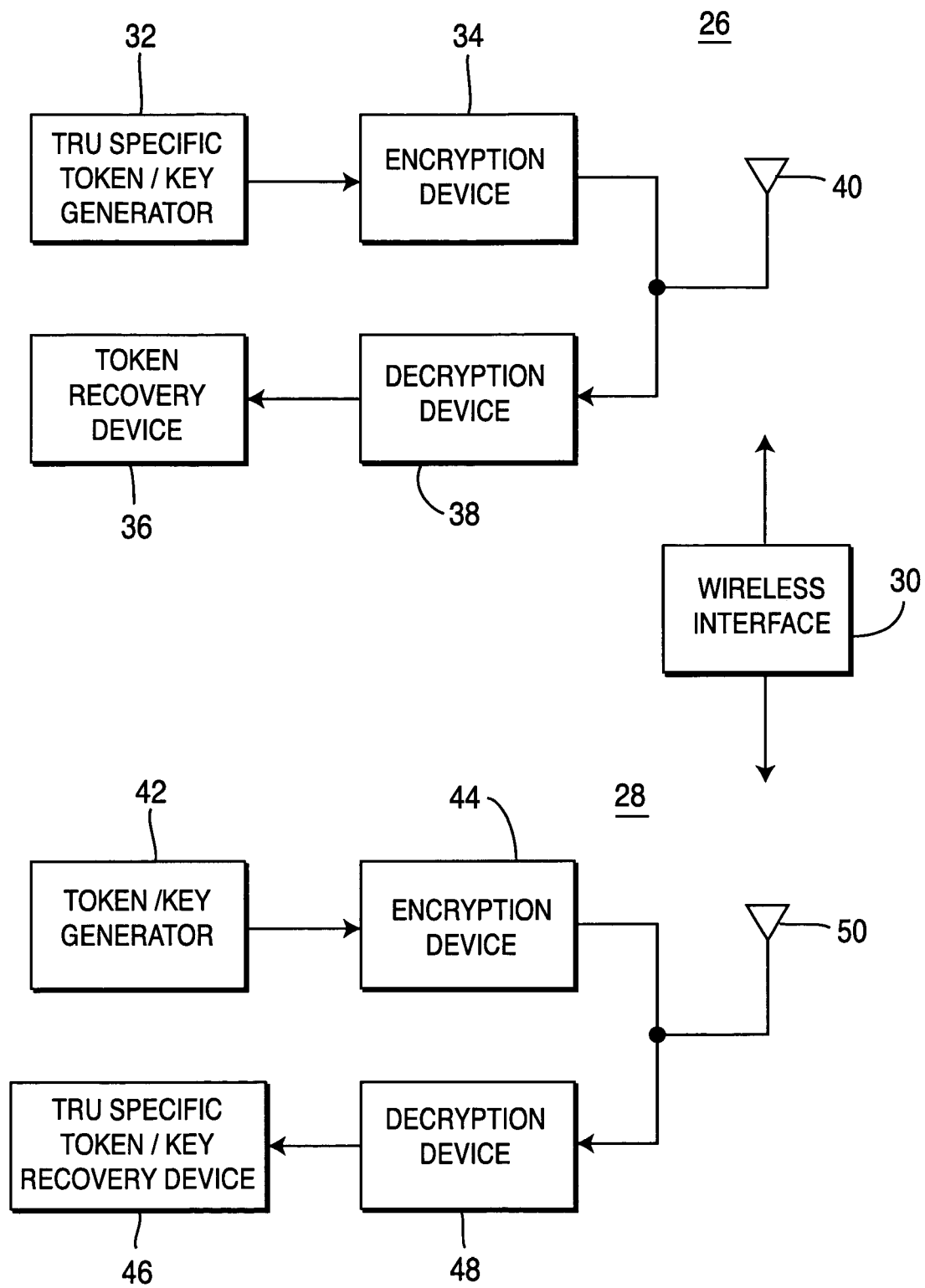
FIG. 3 is a simplified diagram of two transmit/receive units exchanging tokens/keys.

Although the tokens/keys may not always be exchanged between TRUs, FIG. 3 is a simplified block diagram of two TRUs 26, 28 capable of exchanging tokens/keys. Although two TRUs 26, 28 are shown for simplicity, more than two may exchange tokens/keys. Either of the TRUs may be a WTRU, base station or wired device. Although the components are shown separately, the components may be on a single integrated circuit (IC), such as an application specific integrated circuit (ASIC), multiple ICs, discrete components or a combination of IC(s) and discrete component(s).

A TRU specific token/key generator 32 of one TRU 26 produces TRU specific tokens/keys. These tokens/keys and potentially other information are preferably encrypted by an encryption device 34. Although the preferred embodiment encrypts the tokens/keys, in certain applications encryption may not be used. The encrypted tokens are transmitted through a wireless interface 30 using an antenna or antenna array 40.

An antenna/antenna array 50 of the second TRU 50 receives the transmitted encrypted tokens/keys. A decryption device 48 decrypts the received signal and a TRU specific token/key recovery device 46 recovers the tokens/keys 46. A token/key generator 42 of the second TRU 28 then produces tokens/keys. These tokens/keys may or may not be TRU specific tokens/keys. These tokens/keys are optionally encrypted by an encryption device 44 and transmitted by the antenna/antenna array 50.

The encrypted tokens are received using the antenna or antenna array 40 of the first TRU 26. A decryption device 38 decrypts the encrypted tokens/keys, if encryption is used. A token recovery device 36 is used to recover the tokens/keys. The exchange of tokens may need to be repeated so that multiple estimations can be compared to verify that the correct token was received. To indicate a successful receipt of a token, an acknowledgment token may be sent by each user, although no indicator of receipt or other indicator may be sent/received.

To enhance security further, the exchange of tokens may occur at differing abstraction layers. One TRU may send a token/key or set of tokens/keys on one layer and a second TRU sends a token/key or set of tokens/keys on a different layer. As a result, it is difficult for an eavesdropping TRU to gain both tokens/keys or both sets.

When communication between one TRU and an unknown or less trusted TRU is being initiated, the TRUs may use a trusted entity (network node or trusted TRU) to verify the token exchange (act as a middle man). Essentially, the trusted entity acts as a neutral trusted observer until trust is achieved between the two TRUs.

The exchange of tokens/keys may be performed at the initial set-up of the communication link, exchanged periodically or exchanged based on certain criteria. In one embodiment, the exchange of tokens/keys and type of tokens/keys varies based on the number of wireless users or location of a TRU. To illustrate, if the user is at home in a suburban environment, a low level of security may be acceptable. In such an environment, tokens/keys may not need to be exchanged, exchanged only at initial set-up or exchanged infrequently. Detection of the suburban environment may be due to the small number of wireless users in the vicinity or location. The exchange of tokens/keys may not even include TRU specific tokens/keys.

However, if the wireless user is in a Wi-Fi cafe in an urban environment, a higher level of security may be required. A frequent exchange of encrypted tokens/keys may be required. Additionally, multiple tokens/keys may be used to enhance security.

Figure 4:
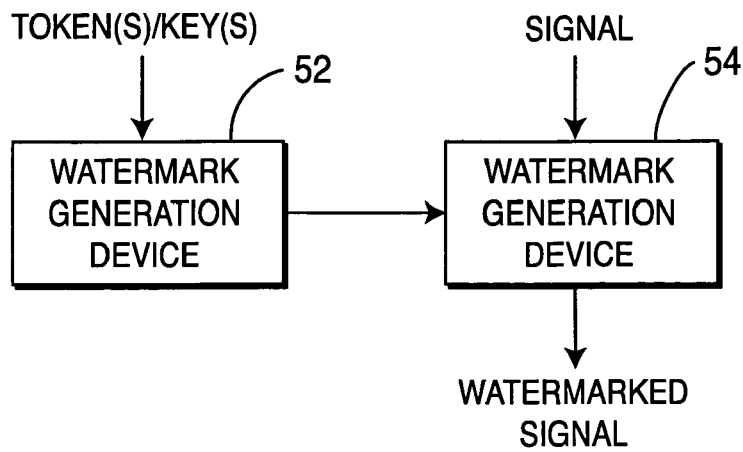
FIG. 4 is a simplified diagram of a watermarking device.

FIG. 4 is a simplified diagram of a watermarking device. A watermark generation device 52 receives token(s)/key(s) and produces a watermark signal. A watermark insertion device 54 inserts the watermark into a signal, producing a watermarked signal.

Figure 5:
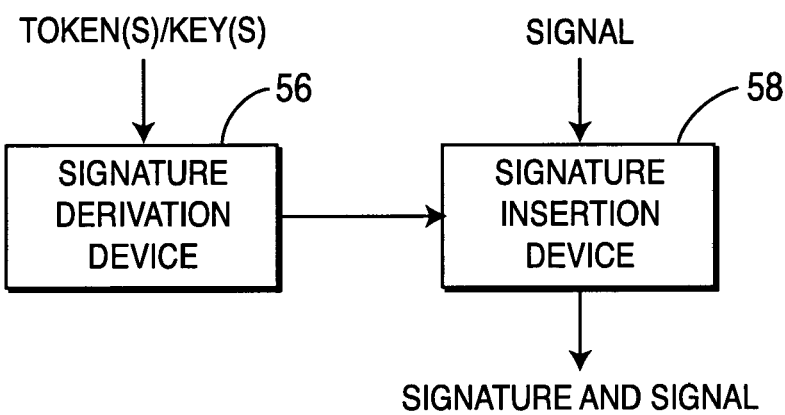
FIG. 5 is a simplified diagram of a signature insertion device.

FIG. 5 is a simplified diagram of a signature insertion device. A signature derivation device 56 receives token(s)/key(s) and produces a signature sequence. A signature insertion device 58 inserts the signature into a signal, producing a signature and signal.

Figure 6:
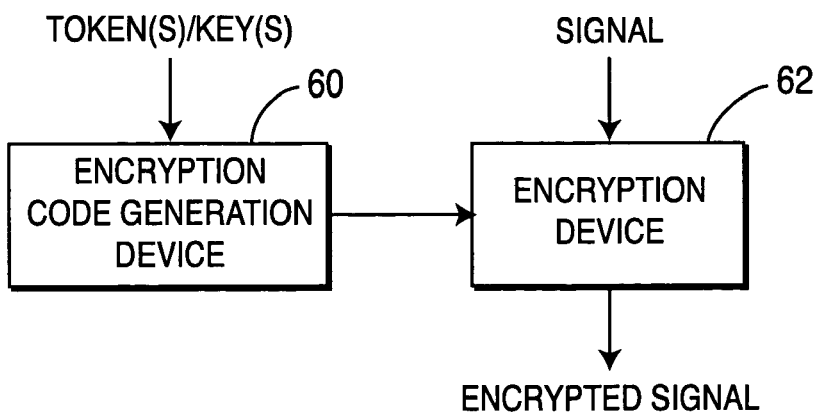
FIG. 6 is a simplified diagram of an encryption device.

FIG. 6 is a simplified diagram of an encryption device. An encryption code generation device 60 receives token(s)/key(s) and produces an encryption code. An encryption device 62 encrypts a signal, producing an encrypted signal.

The devices of FIGS. 4, 5 and 6 may be used at a TRU including a WTRU, base station or wired device. Although the components in these Figures are shown separately, the components may be on a single integrated circuit (IC), such as an application specific integrated circuit (ASIC), multiple ICs, discrete components or a combination of IC(s) and discrete component(s). To detect the watermark/signature or decrypt the produced signals, a reverse procedure of FIGS. 4, 5 and 6 is used.

One application for the token/key generation techniques is for sensor communication. Since sensors tend to be of low hardware complexity, it is desirable that simple security techniques may be used to secure such devices. One such technique is a radio/physical layer watermark derived using sensor characteristics. To illustrate, a sensor measures one of its characteristics and/or one or multiple neighboring sensors characteristics. This value is inserted into the sensors communications at the radio/physical layer, such as by using the sensors hardware, modified hardware or additional hardware components.

Using the sensor characteristics allows for other sensors to readily recognize a given sensor. This is somewhat analogous to human conversational communication where authentication of a sender of information is determined by his/her facial characteristics. One technique to achieve such recognition is adaptive training. In adaptive training, each sensor learns other sensors' characteristics and the learning can adapt over time. As a result, if one sensor is tampered with, the other sensors may detect this tampering, enhancing security of the sensors. To measure the sensor characteristics of other sensors, a given sensor may measure the other sensors information, poll the other sensors requesting the information, or poll the other sensors to allow for the characteristic measurements to be made.

Although high security techniques for token/key generation and watermarking may be used all the time, there is a trade-off between such techniques and overhead. More complex tokens/keys and generated watermarks, require more processing, higher power consumption, and possibly collaboration between TRUs. This commonly may require additional signaling, reducing available radio resources. Also, with complex tokens/keys/watermarks/signatures, rejection of authorized TRUs occurs more often due to the increased possibility of errors in the transferred information and processing of that information. Additionally, to increase security, watermark/signature/token/key management on multiple layers or across layers is desired. Such multi-layer collaboration also adds to the overall overhead.

However, unduly low security can have detrimental impacts. Unauthorized access to data is extremely undesirable, and in particular to confidential information. Also, unauthorized data may be transferred by the TRUs, reducing the available system resources and creating security breaches.

In an embodiment, different watermarks/signatures/encryption codes are used at various security levels. At low security levels, simple watermarks/signatures/encryption codes may be used, such as only WEP or GSM based. At higher levels of security, more complex watermarks/signatures/encryption codes may be used, such as using TRU specific tokens/keys to produce them. At the highest levels of security, complex watermarks/signatures/encryption codes may be used, such as using multiple TRU specific tokens/keys on multiple abstraction layers and other information. Additionally, wireless users at the highest security levels may be asked frequently to re-authenticate themselves.

Figure 7:
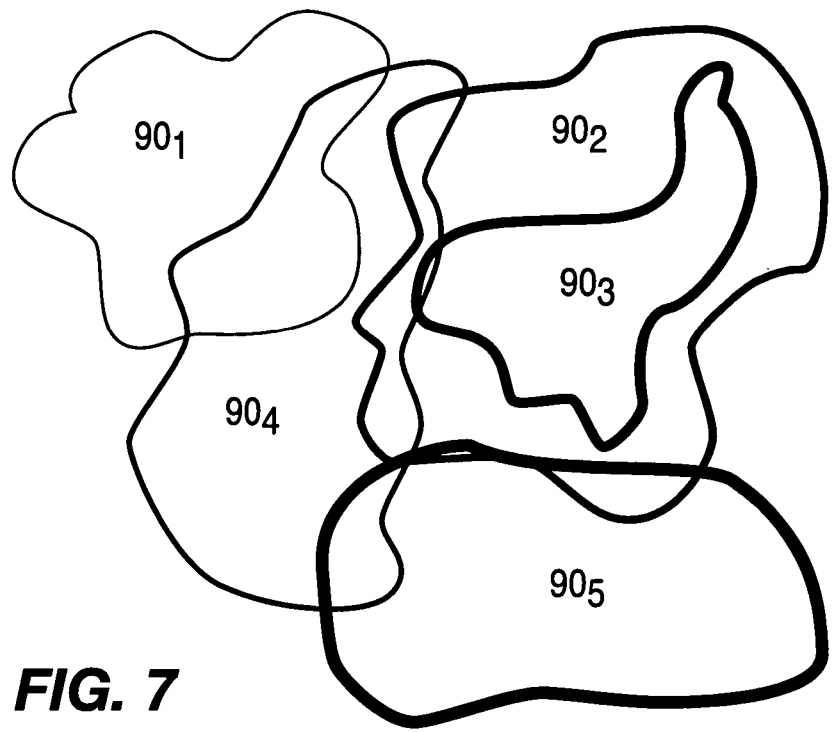
FIG. 7 is an illustration of a security network with multiple trust zones.

FIG. 7 is an illustration of a security network 92. As illustrated in FIG. 7, the security network has multiple trust zones $90_1$ to $90_5$ (90). As shown, the trust zones 90 may co-exist in the same area, such as trust zones $90_2$ and $90_3$, or they may be separate, such as trust zones $90_1$ and $90_5$.

Figure 8:
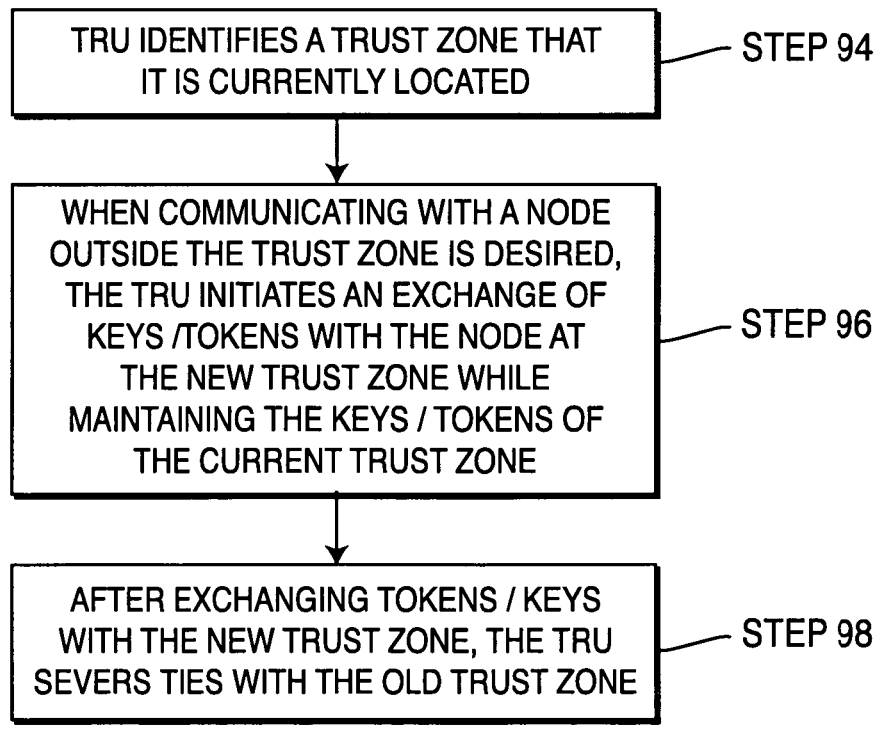
FIG. 8 is a simplified flow chart for handing off between trust zones.

FIG. 8 is a flow diagram of handing-off between trust zones 90. Initially, the TRU identifies a trust zone that it is currently located, step 94. The trust zone may be identified by a security channel indicating the trust zone that you are currently located within. When communication with a node outside the identified trust zone is desired, the TRU initiates an exchange of tokens/keys with the node of the new trust zone, while maintaining the tokens/keys (or exchange of tokens/keys) with the TRU's current trust zone, step 96. After the exchange of tokens/keys has been achieved for the new trust zone and other associated authentication protocols, the TRU severs the ties to the old trust zone, step 98. The departure or arrival of new members to a trust zone may raise or lower the required security level. It may also trigger a mandatory change in tokens/keys. This is somewhat analogous to an employee that leaves a company having various pass codes. Typically, all those pass codes are changed after he leaves.

Figure 9:
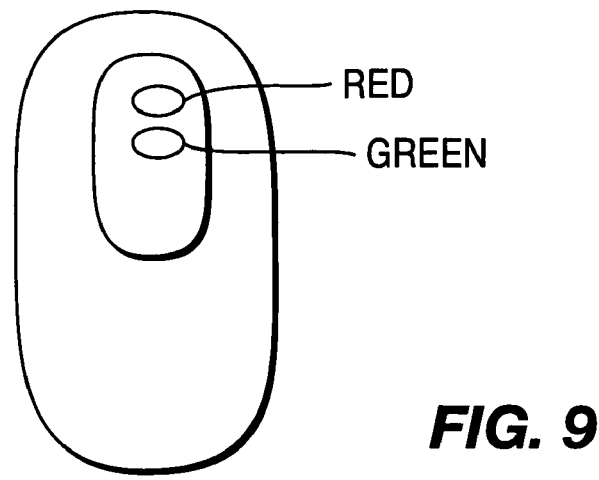
FIG. 9 is an illustration of a security/trust indicator as a two light display embodiment.

To provide the user of a TRU security/trust assurance, an indicator of security/trust may be used, although such an indicator is not required. FIG. 9 illustrates an embodiment of such an indicator. As illustrated, a two light display, such as red or green, is used to indicate whether a certain security/trust level is achieved. To illustrate, a green light indicates that a certain level of security/trust has been reached and a red light indicates that such a level has not been achieved. A user seeing a red indicator may choose not to send credit card information for a purchase until a green indicator is achieved.

Figure 10:
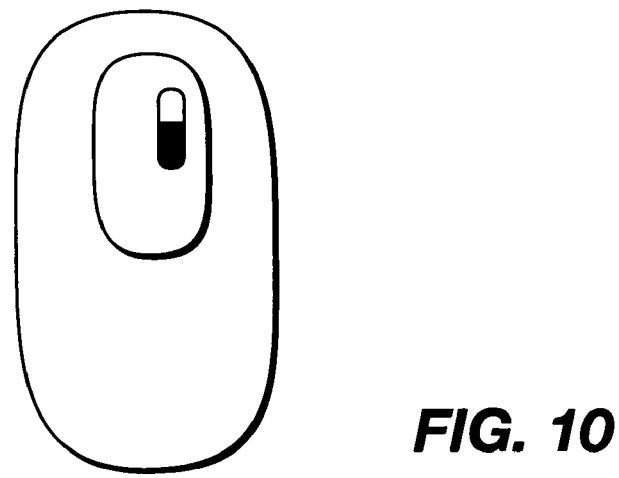
FIG. 10 is an illustration of a security/trust indicator as a bar display embodiment.
Figure 11:
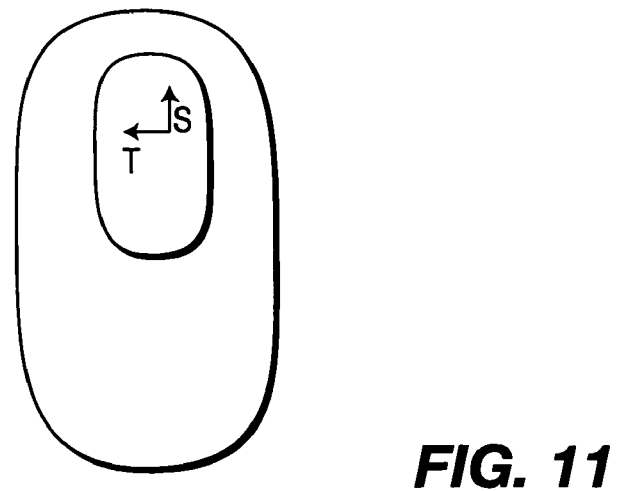
FIG. 11 is and illustration of a security/trust indicator as a multi-dimensional graph embodiment.

Another indicator, as illustrated in FIG. 10, is a bar. The length of the bar indicates the level of security/trust. In the embodiment of FIG. 10, a longer bar indicates increased security/trust. Another indicator, as illustrated in FIG. 11, is a multi-dimensional graph. Although only shown in FIG. 11 as having one dimension of trust (T) and one dimension of security (S), different number of axes and more axis options may be used.

Another form of indicator may be integrated with the TRU applications and/or hardware/software. Certain functions may be prevented when a certain security/trust level is not achieved. To illustrate, the exchange of financial information may be prohibited when security and trust are below certain levels. Alternate, a prompt box may appear to the user indicating that the exchange of certain information is insecure or over un-trusted nodes and recommending that such an exchange not occur at this time. However, the user may choose to override that recommendation by proving an appropriate input, such as clicking on a button or inputting a security override code. In this case the user takes responsibility away from the carrier for possible repercussions of such a transfer.

Another technique for identifying security/trust level that may be used with or apart from the preceding techniques is a security map. The map indicating specific areas and the security level associated with that area. The security level may be indicated by a color, a security code, a security number or other technique. As a result, a user may desire to move or wait until the user is in an area that has higher security/trust prior to commencing certain transactions.

Although token/key transfer information may be sent on existing wireless/wired channels, signaled or broadcast, it is desirable to transfer such information over security channels. Preferably, these channels have a low level of detection, unless a user has a priori information as to their existence. Additionally, multiple security channels may exist on various abstraction layers. One illustrative grouping may be for a security channel to exist in a first group on one, or multiple of, embedded channels as a radio frequency mark, layer-0, waveform or symbol layer; a second group on one or multiple of physical layer (layer-1), bit level; and a third group of layers 2-7, bit-packet level and medium access controller (MAC) header.

To make the security channel harder to detect, it is desirable to have multiple techniques and/or multiple layers used to produce the security channel. To illustrate, a security channel existing at both the physical layer and application layer is difficult to detect in its entirety without a priori knowledge of its structure and existence. Also to illustrate, a security channel derived using a modification to error coding and to a waveform are difficult to detect in combination. Additionally, the data transmitted over the security channel may be split and transmitted at different times. Since the security channels are not constantly present, detection of them is difficult, let alone recovery of data from such channels.

Data transmitted over security channels may be transmitted at different quality of service (QoS). To illustrate, security channel control information may be sent at a higher (QoS) than other data.

The security channels carry security tokens/keys, watermarks, signature and other security information. The channels also may carry contextual, control, signaling, metadata and other non-security related data. The amount of information carried on the channel is based on the implementation of the security channel. Typically, the amount of information carried on such channels is much lower than corresponding channels on their abstraction layer, due to their desired transparency.

The use of a specific security channel allows for multiple TRUs to collectively exchange information, such as tokens/keys. To illustrate, a first TRU may embed a first token in a security channel, a second TRU embeds a second token and so on. As a result, these tokens can be combined and agreement onto various communication tokens/keys, watermarks and signatures can be compared. Additionally, by each TRU adding a token, an audit trail of which TRUs information was transmitted on can be used. Such a technique reduces the possibility of tunneling and unauthorized users having access to data. The security channel may be a point-to-point channel, a shared channel or a common channel.

The tokens/keys added by each TRU may be dictated by a control loop. The control loop may be derived by a cognitive algorithm that sends control signals. The control signals provide rules to the user for their inputs to the security channel.

The selection of the type of security channel may be based on performance criteria, such as carrying capacity, visibility, ease of detection and strength of watermark/signature. To illustrate, various watermarking techniques have differing bandwidths. As a result, the data that can be carried over the channel is limited to that bandwidth. A trade-off exists between visibility and ease of detection. A watermark that is easy to detect and accordingly verify is typically more visible to unauthorized users. Additionally, the strength (difficulty in breaking) of the security channel is also linked to the type of watermark/signature used. One mechanism to control the level of watermarking is a control loop. As security/trust needs increase, the strength of the watermark/signature is increased. The closed loop may also identify the need for adding more information for tokens/keys, additional tokens/keys and a need for a multi-layer security channel(s).

In certain situations, it may be desirable to maintain a security channel when its underlying channel is not present. To illustrate, for non-real time data, a channel may not be present for certain time periods. If the security channel or a portion thereof is embedded in that channel, false (but authentic) looking data may need to be sent over that channel so that the security channel can exist (possibly at all) or with low detectability.

To increase the ease of recovery of data over the security channel(s), the same data may be transferred over multiple layers. To illustrate, an analog watermark embedded in a waveform may be hard to decode under certain channel conditions. However, data transmitted at the application layer may still be decodable due to the different nature of the data transfer. As a result, a particular TRU may lose one security channel or portion of that channel and still be able to maintain the security. In this situation, the suffering TRU may request a change in security channel type to improve its overall security channel QoS.

The use of security channels facilitates the concept of collective TRU peer evaluation, although such evaluations can be done without such channels. Each TRU in a group may be able to verify certain authentication/security/trust issues. To illustrate, a rogue TRU may generate tokens relating to its hardware, location, external interference level, etc. A network node may be able to authenticate the hardware profile, which may be spoofed by the rogue TRU. However, other TRUs in the group may be able to verify the TRUs location, such as a TRU near that location not sensing the rogue TRU and measuring a completely different level of interference. As a result, the network may drop the rogue TRU or force it to re-authenticate. The collaborative TRUs also allow for added security from different paths, different contributors and multiple watermarks/signatures.

The use of collaborative TRUs also facilitates a challenge response scenario. If a node believes that a TRU is not an authentic TRU, it may issue a challenge to the TRU. The challenge may be a request for context related tokens. Other trusted TRUs can be used to determine whether the responses are correct and whether an unauthorized TRU is present. To illustrate, the node may request a token/key including an interference measurement and location information. If a trusted TRU in a similar location has an inconsistent interference measurement, the challenged TRU may not be granted access or access dropped to the wireless network.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method comprising:
   producing wireless transmit/receive unit (WTRU) specific information based on information specific to a user of the WTRU and context information relating to the user, wherein the context information relating to the user includes at least one of the following: rules and modes of user controlled WTRU operation, Internet preferences of the user, or web favorites of the user;
   converting the WTRU specific information into an N-bit vector of fixed length;
   producing a user specific token/key using the N-bit vector based on a specific application for the tokens/keys;
   using the produced token/key to produce a watermark, signature or encryption code; and
   inserting the watermark, signature or encryption code into a signal to be transmitted wirelessly.

2. The method of claim 1 wherein the information specific to the user of the WTRU is selected from the group consisting of a code word, a password, a personal identification number, a biometric reading of the user, radio frequency (RF) tags, or a credit/debit/smart card.

3. The method of claim 1 wherein the produced token is used to authenticate the WTRU.

4. A method comprising:
   providing a first token/key for use in producing a watermark, signature or encryption code, wherein the first token/key is derived from an N-bit vector based on a specific application for the tokens/keys, and wherein said N-Bit vector is derived from a wireless transmit/receive unit (WTRU) user specific information and information relating to a context of the user, wherein the context information relating to the user includes at least one of the following: rules, and modes of user controlled WTRU operation, Internet preferences of the user, or web favorites of the user;
   based on the first token/key, producing a second token/key, the production of the second token/key is either a function of or derived from the first token/key or controlled by the first token/key; and
   generating a watermark from the second token/key and inserting the watermark into a wireless communication signal.

5. A wireless transmit/receive unit (WTRU) comprising:
   a WTRU specific token/key generation device configured to produce a token/key associated with a specific application for the tokens/key, said token/key derived from an N-bit vector that is derived from information associated with a user of the WTRU and context information relating to the user of the WTRU, wherein the context information relating to the user includes at least one of the following: rules and modes of user controlled WTRU operation, Internet preferences of the user, or web favorites of the user;
   a watermark/signature/encryption code generation device having an input configured to receive the token/key and produce a watermark/signature/encryption code; and
   a watermark insertion/signature insertion/encryption device having an input configured to receive a communication signal and an output configured to produce a watermark inserted/signature inserted/encrypted signal for wireless transmission.

6. The WTRU of claim 5 further comprising:
   a token/key recovery device for recovering a token/key from received wireless transmissions.

* * * * *